United States Patent
Shulga et al.

(10) Patent No.: US 10,296,423 B2
(45) Date of Patent: May 21, 2019

(54) SYSTEM AND METHOD FOR LIVE VIRTUAL INCREMENTAL RESTORING OF DATA FROM CLOUD STORAGE

(71) Applicant: Acronis International GmbH, Schaffhausen (CH)

(72) Inventors: Victor Shulga, Moscow (RU); Vasily Semyonov, Moscow (RU); Serguei Beloussov, Singapore (SG); Stanislav Protasov, Moscow (RU); Mark Smulevich, Moscow (RU); Andrey Redko, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 575 days.

(21) Appl. No.: 15/086,356

(22) Filed: Mar. 31, 2016

(65) Prior Publication Data

US 2017/0286234 A1    Oct. 5, 2017

(51) Int. Cl.
*G06F 11/14* (2006.01)
*G06F 9/4401* (2018.01)

(52) U.S. Cl.
CPC ........ *G06F 11/1464* (2013.01); *G06F 9/4416* (2013.01); *G06F 11/1441* (2013.01); *G06F 11/1451* (2013.01); *G06F 11/1469* (2013.01); *G06F 2201/84* (2013.01); *G06F 2201/86* (2013.01)

(58) Field of Classification Search
CPC ............. G06F 11/1469; G06F 11/1464; G06F 11/1451; G06F 11/1484; G06F 11/1417; G06F 11/1435; G06F 3/065; G06F 3/067; G06F 3/0632

See application file for complete search history.

(56) References Cited

U.S. PATENT DOCUMENTS

| | | | | |
|---|---|---|---|---|
| 7,475,282 B2 * | 1/2009 | Tormasov | ........... | G06F 11/1417 714/6.3 |
| 7,721,138 B1 * | 5/2010 | Lyadvinsky | ........ | G06F 11/1417 714/10 |
| 7,937,612 B1 * | 5/2011 | Lyadvinsky | ........ | G06F 11/1417 707/679 |
| 8,190,574 B2 * | 5/2012 | Barnes | .............. | G06F 17/30079 707/646 |
| 9,983,936 B2 * | 5/2018 | Dornemann | ........ | G06F 11/1435 |
| 10,002,052 B1 * | 6/2018 | Lyadvinsky | ........ | G06F 11/1464 |
| 2006/0143501 A1 * | 6/2006 | Tormasov | ........... | G06F 11/1417 714/6.3 |

* cited by examiner

*Primary Examiner* — Nadeem Iqbal

(74) *Attorney, Agent, or Firm* — Arent Fox LLP; Michael Fainberg

(57) ABSTRACT

A system and method is disclosed for live virtual incremental restoring of data from a cloud storage. An example method includes, in response to detecting a data backup, collecting information by a hardware processor of a computing device for configuring a list of changed sectors (LCS) of a storage medium of the computing device as a result of the data backup. The method further includes virtually restoring at least a portion of electronic data saved in the storage medium of the computing device from the cloud storage, the selected electronic data being previously saved in the cloud storage. The method also includes rebooting the computing device and applying changes to the storage medium of the computing device based on the LCS during a subsequent data backup.

20 Claims, 6 Drawing Sheets

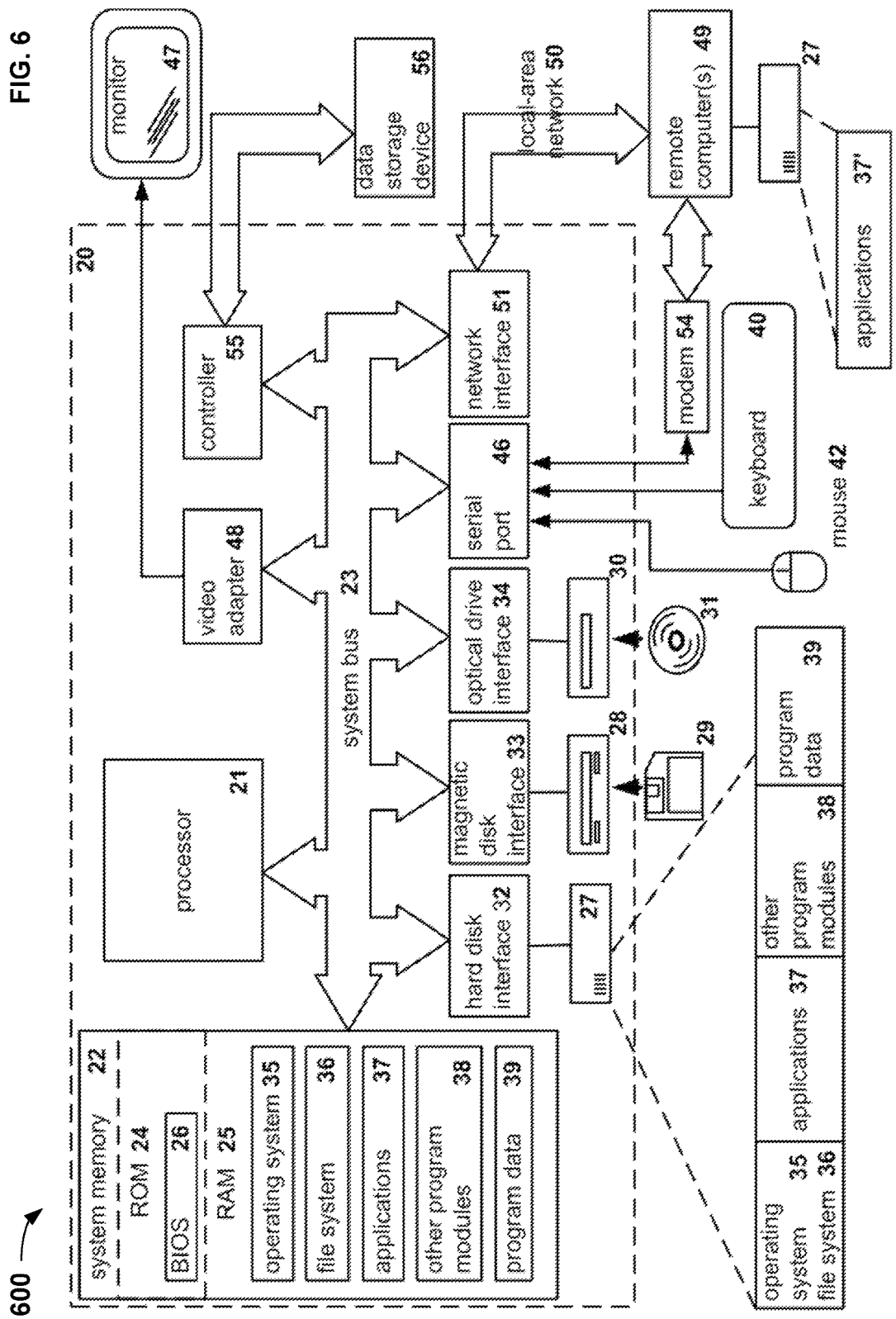

SYSTEM AND METHOD FOR LIVE VIRTUAL INCREMENTAL RESTORING OF DATA FROM CLOUD STORAGE

FIELD OF TECHNOLOGY

The present disclosure generally relates to the field of electronic data backup, and, more specifically, to a system and method for live virtual incremental restoring of data of at least one physical machine from a cloud storage in a cloud computing network environment, and applying such virtual data restoration during subsequent data backup(s) to the at least one physical machine.

BACKGROUND

As a wide variety of computing devices become more prevalent and widely used among the general population, the amount of electronic data generated and utilized by such devices has rapidly increased. Recent advancements in computing and data storage technology have enabled these devices to store and process large amounts of information for a variety of applications such as document editing, media processing, and the like. Further, recent advancements in communication technology can enable computing devices to communicate data at a high rate of speed. These advancements have enabled the implementation of services such as network-based backup, which allow a user of a computing device to maintain one or more backup copies of data associated with the computing device at a remote location on a network.

Among these network-based data backup systems, cloud storage is a model of data storage in which electronic data is stored in logical pools, the physical storage spans multiple servers (and often locations), and the physical environment is typically owned and managed by various cloud storage providers who are responsible for keeping the data available and accessible, and the physical environment protected and running. Individual users, enterprises, and organizations buy or lease storage capacity from these storage providers to store user, organization, or application data. Cloud storage services may be accessed through a co-located cloud computer service, a web service application programming interface (API) or by applications that utilize the API, such as cloud desktop storage, a cloud storage gateway or Web-based content management systems.

In the context of cloud-based storage, one may need to periodically check that an entire computing device can be safely restored from a last data backup stored in a cloud storage, boot the Operating System (OS) restored, and ensure that all of the services and programs associated with the computing device work correctly. However, restoring from a backup via a cloud may require a substantial amount of time because of the size of the backup or the speed of the underlying network. In some instances, a 500 GB memory partition may be restored up to, e.g., 13 hours using a relatively fast 10 MB communication channel available on a communication network.

Accordingly, there is a need for a system and method for a faster data restoration operation in cloud-based data backup systems.

SUMMARY

The present disclosure provides an effective solution for the foregoing problems by live virtual incremental restoring electronic data using a boot from a data cloud and applying changes to backed up data during a subsequent backup event. Disclosed are example systems, methods and computer program products for virtual restoring of data from a cloud storage.

In one aspect, an exemplary method is disclosed for live virtual incremental restoring of data from a cloud storage. The exemplary method includes in response to detecting a data backup, collecting information by a hardware processor of a computing device for configuring a list of changed sectors (LCS) of a storage medium of the computing device as a result of the data backup; virtually restoring at least a portion of electronic data saved in the storage medium of the computing device from the cloud storage, the selected electronic data being previously saved in the cloud storage; and rebooting the computing device and applying changes to the storage medium of the computing device based on the LCS during a subsequent data backup.

In another aspect, the method includes creating a virtual volume set (VVS) by a dedicated boot loader of the computing device in response to the data backup, the VVS being configured to: detect one or more write requests to the storage medium of the computing device occurred during two consecutive data backups; store the one or more write requests in a dedicated storage associated with the VVS; in response to determining that a requested sector corresponding to at least one read request is located in the dedicated storage, obtain information relating to data changes from the dedicated storage; in response to determining that the requested sector is located in the LCS, obtain information relating to data changes from the cloud storage; and in response to determining that the requested sector is not located in the LCS, obtain information relating to data changes from an original volume of the requested sector.

In another aspect, the dedicated boot loader of the computing device is further configured to: reboot the computing device by deactivating a default boot loader of the computing device; establish a connection to the cloud storage; set hooks to intercept input/output (I/O) requests into the dedicated boot loader and the default boot loader on the VVS; and activate the default boot loader.

In another aspect, the method includes running an operating system (OS) of the computing device based on information stored on the VVS for checking applications and data associated with the computing device; and in response to a command not to restore data, rebooting the computing device using the OS of the computing device.

In another aspect, the method includes running an operating system (OS) of the computing device based on information stored on the VVS for checking applications and data associated with the computing device; and in response to a command to restore data, checking one or more restored sectors that are detected based on an indicia; redirecting the one or more write requests to the storage medium of the computing device and marking corresponding sectors of the storage medium as restored; and copying sectors from the dedicated storage and the cloud storage and marking the sectors as restored.

In another aspect, the method includes, in response to detecting all sectors being marked as restored, disabling the dedicated boot loader and unloading the hooks.

In another aspect, the method includes restoring a plurality of sectors of the computing device based on a priority determined based at least upon a usage frequency of each sector.

In another aspect, the method includes in response to detecting that an activated working mode of the computing device disables the dedicated storage, directing all data requests to the storage medium of the computing device to the dedicated storage before rebooting the computing device, and disabling the dedicated storage by the dedicated boot loader.

In another aspect, a system is disclosed for live virtual incremental restoring of data from a cloud storage. According to the exemplary aspect, the system includes an electronic memory; and a hardware processor couple to the electronic memory and configured to: in response to detecting a data backup, collect information for configuring a list of changed sectors (LCS) of the electronic memory of the computing device as a result of the data backup; virtually restore at least a portion of electronic data saved in the electronic memory of the computing device from the cloud storage, the selected electronic data being previously saved in the cloud storage; and reboot the computing device and apply changes to the electronic memory of the computing device based on the LCS during a subsequent data backup.

In another aspect, a non-transitory computer readable medium storing computer executable instructions for live virtual incremental restoring of data from a cloud storage, the instructions being configured for: in response to detecting a data backup, collecting information by a hardware processor of a computing device for configuring a list of changed sectors (LCS) of a storage medium of the computing device as a result of the data backup; virtually restoring at least a portion of electronic data saved in the storage medium of the computing device from the cloud storage, the selected electronic data being previously saved in the cloud storage; and rebooting the computing device and applying changes to the storage medium of the computing device based on the LCS during a subsequent data backup.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 illustrates an example computer system on which the disclosed systems and method can be implemented.

DETAILED DESCRIPTION

Figure 1:
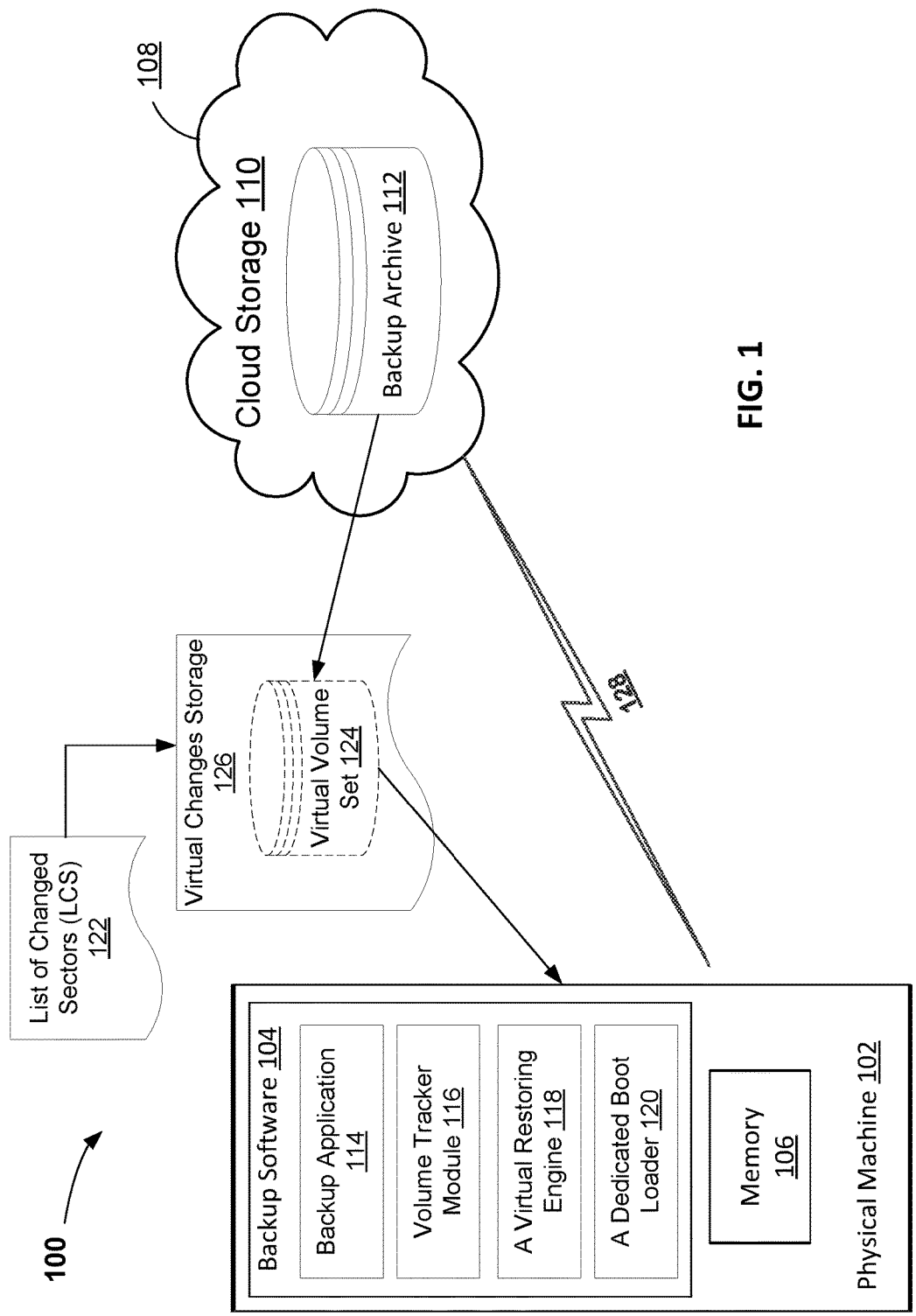
FIG. 1 illustrates a system for live virtual incremental restoring of data from a cloud storage according to an exemplary aspect.

Disclosed herein are exemplary aspects of systems, methods and computer program products for live virtual incremental restoring of data from a cloud storage. Various aspects of invention will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects of the invention FIG. 1 illustrates a system 100 for live virtual incremental restoring of data from a cloud storage according to an exemplary aspect. As shown, a physical machine 102, which is generally a hardware- and software-based computing device, which may include one or more virtual machines, comprises backup software 104 and memory 106 containing various electronic data (e.g., text documents, images, video/audio, executable files, etc.) to be restored on demand or in response to certain data loss events such as accidental or unknowing data deletion, modification, overwrite, virus infection, or hardware/software failures. The physical machine 102 may be one of personal computers, servers, laptops, tables, mobile devices, smart phones, cellular devices, portable gaming devices, media players or any other suitable devices that can retain, manipulate and transfer data. The memory 106 may be any type of device for storing digital information such as a hard drive, flash memory, disk, or tape. The backup software 104 may include a software application installed on the physical machine 102 and executable by a hardware processor of the physical machine 102, such as central processing unit 21 of FIG. 6.

It is to be appreciated that the system 100 may include any suitable and/or necessary interface components (not shown), which provide various adapters, connectors, channels, communication paths, to facilitate exchanging signals and data between various hardware and software components of the physical machine 102 and any applications, peer devices, remote or local server systems/service providers, additional database system(s), and/or with one another that are available on or connected via an underlying network 128.

According to the exemplary aspects disclosed herein, the backup software 104 may be configured to perform a backup of data stored in the memory 106 to a remote storage device, such as in a data cloud 108, and ultimately stored in a backup archive 112 of a cloud storage 110 of the data cloud 108. It is to be appreciated that the cloud storage 110 may include any suitable component, device, hardware, and/or software. The data cloud 108 may refer to any collection of resources (e.g., hardware, software, combination thereof, etc.) that are maintained by a party (e.g., off-site, on-site, third party), and accessible by one or more physical machines 102 over the network 128 (e.g., Internet, wireless, LAN, cellular, Wi-Fi, WAN). Such data cloud 108 and the associated cloud storage 110 may provide any service, network service, cloud service, collection of resources, and can be accessed by one or more physical machines 102 via the network 128. For instance, two or more physical machines 102 may access, join, and/or interact with the data cloud 108 via at least each designated storage space in the cloud storage 108.

As shown in FIG. 1, the backup software 104 may comprise a backup application 114, a volume tracker module 116, a virtual restoring engine 118, and a dedicated boot loader 120. According to the exemplary aspect, the backup application 114 may be configured to perform a volume level backup of the data stored in the memory 106 to the cloud storage 110 and restore data from the cloud storage 110. This type of data backup technique may be referred to as "online backup" during which specific files or the entire contents of the memory 106 are backed up to the cloud storage 110 using a Web browser interface (not shown) provided by the backup application 114. Such online backup process generally works as a background process, such that, to a user, no discontinuity is apparent as the system 100 copies, merges or otherwise accepts certain memory blocks from a temporary storage to a main storage as a background process. For example, contents of the memory 106 may be automatically saved to the online backup on a regular basis, or a user selected schedule basis at a specific time. Alternatively, automatic data backup may be carried out whenever changes to the contents of the memory 106 are made. To reduce the required storage capacity for data backups, identical data files may be copied only once, or only changes to a data file are backed up rather than storing multiple complete copies.

Working together with the backup application 114, the volume tracker module 116 may be configured to track and collect any changes on a volume associated with the memory 106 that take place during a period of time between two or more events, such as between two data backup events. Here, a "volume" may generally refer to a portion of a storage medium such as a disk (physical or virtual) that is treated as a unit by an OS. For example, in Windows OS, volumes may be designated by "drive" letters. A volume may include all or part of a physical disk, and may also include portions of multiple disks as, for example, when using Redundant Array of Independent Disks (RAID) storage schemes. A volume is typically formatted with a file system to enable an OS to read and write individual files into a designated storage medium. In one example, a "snapshot" of a volume may represent an image of the complete state of a volume at a point in time. A snapshot is usually not a physical copy, as it may be undesirable to stop a running machine while a physical copy is made. Instead, a snapshot operation itself usually comprises recording a timestamp, and, thereafter, preserving pre-snapshot versions of all files, including subsequently deleted files. In normal operation, when the OS and application software detect a new version of the file system, including all changed and deleted files, pre-snapshot versions of files may be made available and traceable via a special interface. When used in carrying out a backup procedure, a "source snapshot" is typically transient, and it is deleted after completion of the backup procedure. After a source snapshot is created, a source machine, such as the physical machine 102, may continue to write to volume(s) as usual, but any previously used blocks which would be overwritten are copied into a snapshot file so that they are not lost and can be retrieved via, e.g., a dedicated interface.

According to some exemplary aspects, the volume tracker module 116 may track all of the changes occur after a first data backup, contemporaneously obtain a list of the sectors modified as a result of the backup, and use this list for a second data backup, thereby achieving a faster data backup by at least avoiding comparing live data with what have been stored in the backup archive 112 of the cloud 108 during each data restoration process.

For example, after a most recent data backup which may involve storing at least a portion of the electronic user data stored in the memory 106 of the physical machine 102 into the backup archive 102 of the cloud 108, the volume tracker module 116 may start collecting information to configure a list of changed sectors (LCS) 122, similar to mechanism of the snapshot file described above. The LCS 122 may be configured based on information gathered from the moment of a previous backup which has been stored either locally in the memory 106 of the physical machine 102, or in the cloud storage 108. When the physical machine 102 is rebooted, the LCS 122 may be preserved and maintained by the physical machine 102. Subsequently, a user may start a so-called "trial" session or a "try-and-decide" mode of the backup software 104, during which the volume (partition(s)) from the backed up data (generally referred to as an "image") stored in the data cloud 108 may be restored. According to the exemplary aspect, the volume may be restored virtually, leaving the physical machine 102 unchanged with respect to the electronic data stored thereon, and one can subsequently apply to the physical machine 102 any new changes made after a previous backup and reflected in the LCS 122. As such, all restored (or tested) volumes become virtual, and all new changes are moved to a dedicated storage such as Virtual Changes Storage (VCS) 126 which creates a Virtual Volume Set (VVS) 124. In accordance with one aspect of the invention, a backup engine such as a virtual restoring engine 118 in FIG. 1 may be implemented to include and control the volume tracker module 116 and the VCS 126. The LCS 122 itself may be stored on a local storage of the physical machine 102. All data changes according to the LCS 122 may be downloaded from the cloud 108 and stored on the physical machine 102.

Figure 2:
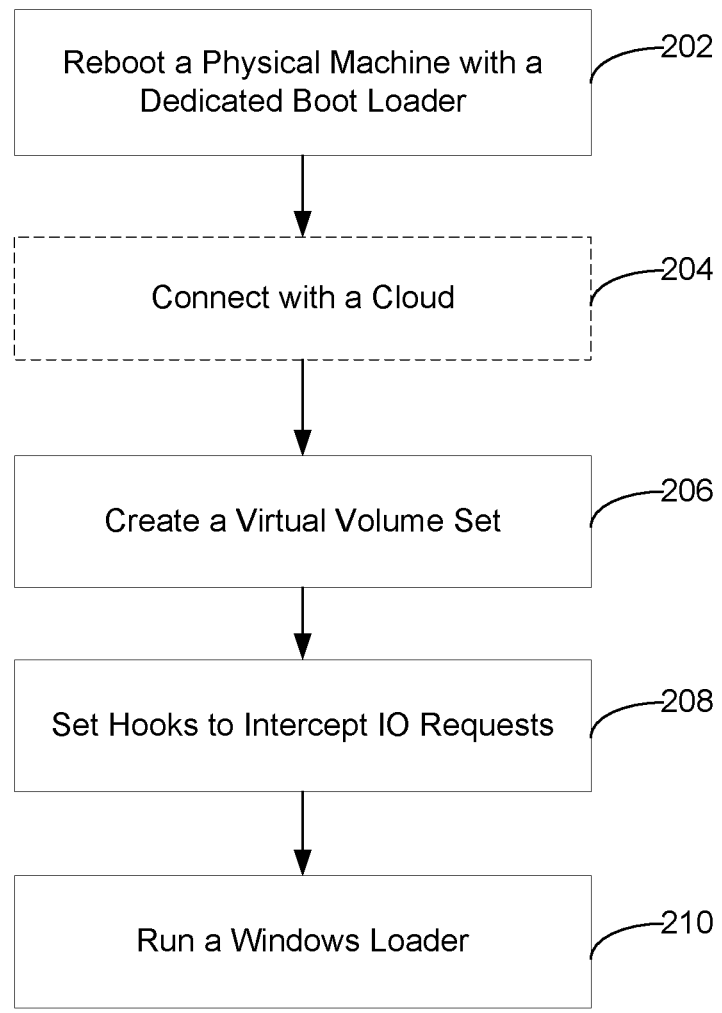
FIG. 2 is a flow chart illustrating example operations performed by a dedicated boot loader for live virtual incremental restoring of data from a cloud storage according to an exemplary aspect.

Referring now to FIG. 2, when the physical machine 102 reboots (202), a proprietary or dedicated boot loader 120 of FIG. 1 may replace, e.g., a Windows loader or a standard default boot loader associated with the underlying OS of the physical machine 102, and make a connection to the cloud 108 (204) if the volume has been virtually restored as described above. This activated dedicated boot loader 120, executed by the virtual restoring engine 118, may be configured to process read and write requests (or any other disk access requests that alter the contents of the data) in connection with a virtual storage such as the VCS 126 whose operation logic will be described fully below. That is, among other things, the present invention facilitates virtual restoration of data using a boot partition from backed up data (image) from a data cloud using locally existing data and subsequently applying changes detected during such virtual restoration to a physical machine during a next data restoration.

The image stored in the data cloud 108 may include a partition that relates to the OS of the physical machine 102, or may include data that are necessary to ensure the physical machine 102 to perform useful activities, or both. For purposes of the present discussion, it is assumed that the image represents valid data, and that the physical machine 102, if restarted from that image, will function properly. In some instances, it may be necessary to use not just the latest image, but some other image, which was created previously, if it is believed that the latest image does not represent valid data. In sum, it is assumed that there is at least one image retrievable by the data cloud 108, that can be used for data restoration of the physical machine 102, and which represents valid data.

During a start up in a conventional operating system, for example, Windows NT. using a BIOS (Basic Input/Output System), the hardware of such system sends a request to a predefined data storage device (usually a local hard drive), which contains a Master Boot Record (MBR). The MBR may contain instructions for organizing a file system, loading the initial elements of the OS into the memory 106. Then, one or more device drivers may be launched, and the OS starts functioning, in the usual manner. It should be noted that BIOSs of most commonly used computing systems may be programmed to provide the possibility of assigning priority to various bootable devices. The description herein may be applicable to the Intel X86 architecture, AMD64, IA-64 and EFI. Other processor architectures and OSs have slightly different approaches, although the general principle is essentially the same, and are intended to be covered by this description. Moreover, if data stored in the image are compressed, decompression of such data may be carried out before being directed to the dedicated boot loader 120. The backup (compressed or un-compressed block level backup of the data storage device) may be visible to the dedicated driver boot loader 120 as a "normal" bootable data storage.

According to the exemplary aspects disclosed herein, the reduction in operation downtime and a significant simplification in the restoration procedure may be accomplished by use of an MBR, which ensures the completion of a loading procedure with the use of the dedicated boot loader 120. The dedicated driver boot loader 120 may create (206) a virtual hard drive for the VCS 126 and the VVS 124 using an image of the restored disk to redirect addressing of various access requests to applications to the VCS 126.

Figure 3:
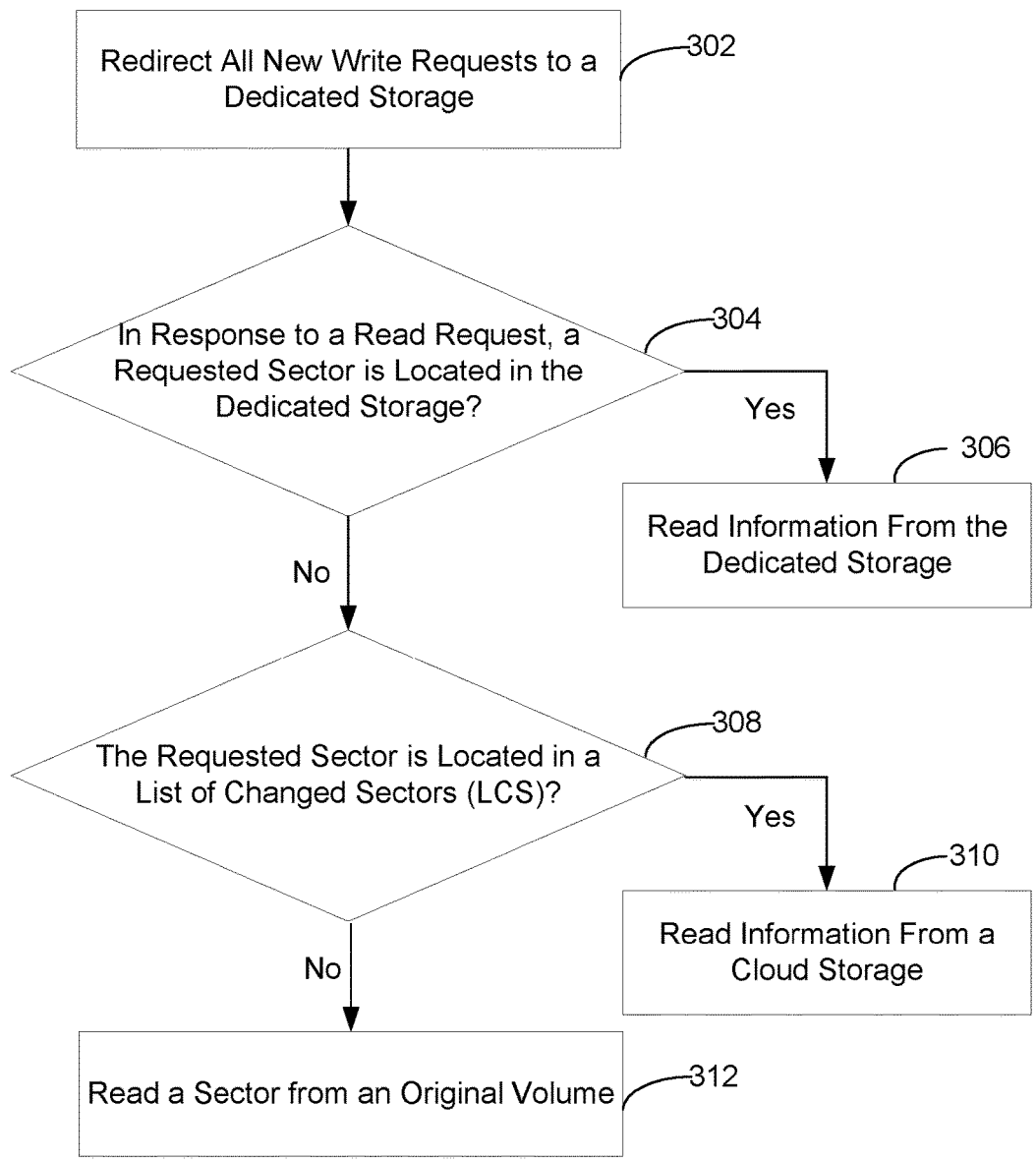
FIG. 3 is a flow chart illustrating example operations performed by a virtual storage set for live virtual incremental restoring of data from a cloud storage according to an exemplary aspect.

Once being created, the VCS 126 and its operation logic may be configured, as shown in FIG. 3, to redirect (302) all new write requests to dedicated storage associated with the VCS 126 and the VVS 124 created and stored thereon, at least because an I/O filter associated with the physical machine 102 used to interface to its data storage is updated accordingly. In response to at least one received read request, the VCS 126 and its operation logic may be configured to determine and detect (304) that a requested sector is located in the dedicated storage, and obtain (306) relevant information of the requested sector from it. However, if the requested sector is not to be located in the dedicated storage, the VCS 126 and its operation logic may determine (308) and detect that the requested sector is in the LCS 122, and obtain (310) relevant information of the requested sector from the cloud 108 via the connection established earlier. If the requested sector is not located in the LCS 122, the VCS 126 and its operation logic may be configured to read (312) a sector from the original volume of the physical machine 102.

After the exemplary operations of the VCS 126 are completed, referring back to FIG. 2, the dedicated boot loader 120 of the physical machine 102 may set (208) hooks to intercept I/O requests into itself and Windows on the VCS 126, then recall or run (210) the standard Windows loader. In other words, by substituting a new interrupt handling routine for the standard one in handling disk access requests, the system 100 may use the VCS 126 for data restoration process. From the perspective of the hardware, the VCS 126 and the VVS 124 may be treated as if it were an integral local hard drive. As a result, Windows is loaded from the VCS 126, and a user is enabled to check all applications and data associated with the physical machine 102. In case that the user decides not to restore (i.e., revert) data, a revert command may be activated by the user to unset the dedicated boot loader 120 resulting in rebooting and booting the physical machine 102 with its standard OS. On the other hand, if the user decides to restore data, an apply command may be activated by the user and a process of applying (PoA) starts.

According to some exemplary aspects of the PoA, the VCS 126 and its operation logic may start to check "marked as restored" sectors at first in response to the apply command. Such "marked as restored" sectors may be indicated in connection with one or more identifiers, "flags," or bits. Thereafter, all write requests may be redirected to a real volume (e.g., the memory 106 of the physical machine 102) and sectors of the real volume that have been affected may be marked as restored. Further, the PoA may perform copying sectors that have been affected from the VCS 126 and from the backup archive 112 of the cloud storage 110, and marking these sectors as restored. In response to detecting all sectors being marked as restored, the VCS 126 and its operation logic may stop, the dedicated boot loader 120 may be disabled and all the hooks may be unloaded. After the boot loader 120 stops working, a driver volume filter (not shown) may be loaded and continue virtualizing volumes of VVS 124.

Figure 4:
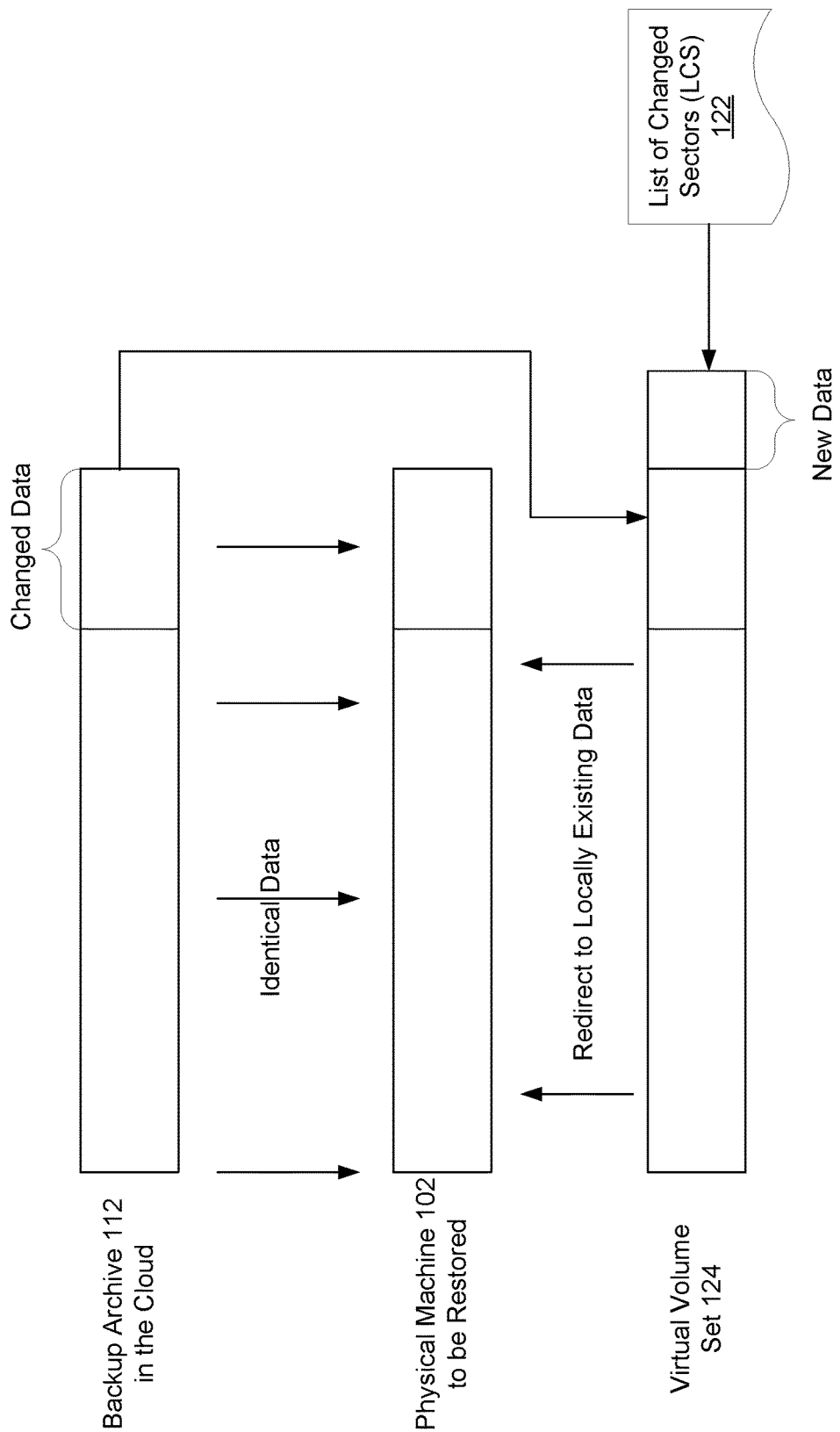
FIG. 4 illustrates an example data restoration for live virtual incremental restoring of data from a cloud storage according to an exemplary aspect.

FIG. 4 generally illustrates how data restoration is performed, according to some exemplary aspects of the present invention. In order to configure the LCS 122, all the existing data from the physical machine 102 may not simply be copied during each data processing operation. Rather, links may be created between each existing sector and the actual data using, e.g., a bitmap and a database that contains a set of translations, or links, to the locations of the relevant data blocks. More specifically, the bitmap may have a bit or a flag corresponding to each data block in the memory 106 of the physical machine 102, where, e.g., a "0" in the particular bit of the bitmap may indicate that data in a particular data block has not been change since a time $t_1$. A "1," on the other hand, may represent that the data of that data block has been changed, or vice versa. In the event that data has been changed, the database may contain a link to the physical address at which the modified data block can be located.

In other words, the bitmap may be considered as an indicator of the validity of the links in a database. A "0" bit in the bitmap may mean that the link is not valid, while a "1" in the bitmap may mean that the link is valid (or vice versa, as desired by the particular developer). Resetting the bitmap to zero is functionally analogous to dropping all changes. At the same time, there is no need to clear memory areas that store links. During the process of accepting the changes to the data reflected in a storage, the bits in the bitmap may be reset once the data block at issue has been copied from the storage to, e.g., another block of the storage, or have been merged to the storage.

As shown in FIG. 4, in case that some sectors are determined and detected to be damaged or deleted while their backup exists in the backup archive 112 of the data cloud 108, these sectors may be copied from the cloud into the VCS 126 and the VVS 124 stored thereon. The LCS 122 may be configured to collect and store relevant information related to data that was changed on the local machine from the moment of last backup in connection with the link mechanism described above. These data may need to be downloaded from the data cloud 108, but not all of them. If there will be writing of new data on these sectors, there may be no need to download them. Thereafter, once a restore is completed, any changes detected may be applied to the physical machine 102. Or, these changes may be discarded and the physical machine 102 reverts to its initial state, which was stored in the backup archive 112.

In accordance with some exemplary aspects of the present invention, an incremental restore mode may be performed by the system 100, which may not involve using virtual changes of various user data. Rather, the system 100 working under such incremental restore mode may perform user data restoration in real time which may be a combination of operations relating to "active restore" from the date cloud 108 and recovery of only modified sectors. Active restore may allow a user to start working with recoverable data without waiting for the recovery of all disk/partition/computer. The order of recovery of data blocks may be redefined depending on the user's access requests to these memory or disk blocks. For example, the priority of recovery of a block being currently requested may be adjusted to the highest. Such incremental restore mode may facilitate a user computing device (e.g., the physical machine 102 in FIG. 1) used for a date restoration task to return to the state of last data backup with a fast speed on the order of, e.g., 10-20 seconds with minimum downtime due to the restoration from backup. That is, virtual live restore disclosed herein may work with a disabled VCS 126 by at least restoring modified data (according to LCS 122) directly to physical volume. More specifically, a user may activate the mode of "Incremental Restore" on the physical machine 102 without the "try-and-decide" mode (involving VCS 126 uses) of the backup software 104 discussed above before the first reboot of the physical machine 102. However, such an activation on a live system may cause subsequent write requests to be disallowed which may potentially increase the number of sectors that need to be downloaded from the data cloud 108. To solve this problem, after the "Incremental Restore" mode being activated, all requests may be forwarded to the VCS 126 before the first reboot of the physical machine 102. Thereafter, the dedicated boot loader 120 may be configured to monitor and detect that the "Incremental Restore" mode is active with no VCS 126 uses and accordingly remove the VCS 126 from further processing and operations.

Figure 5:
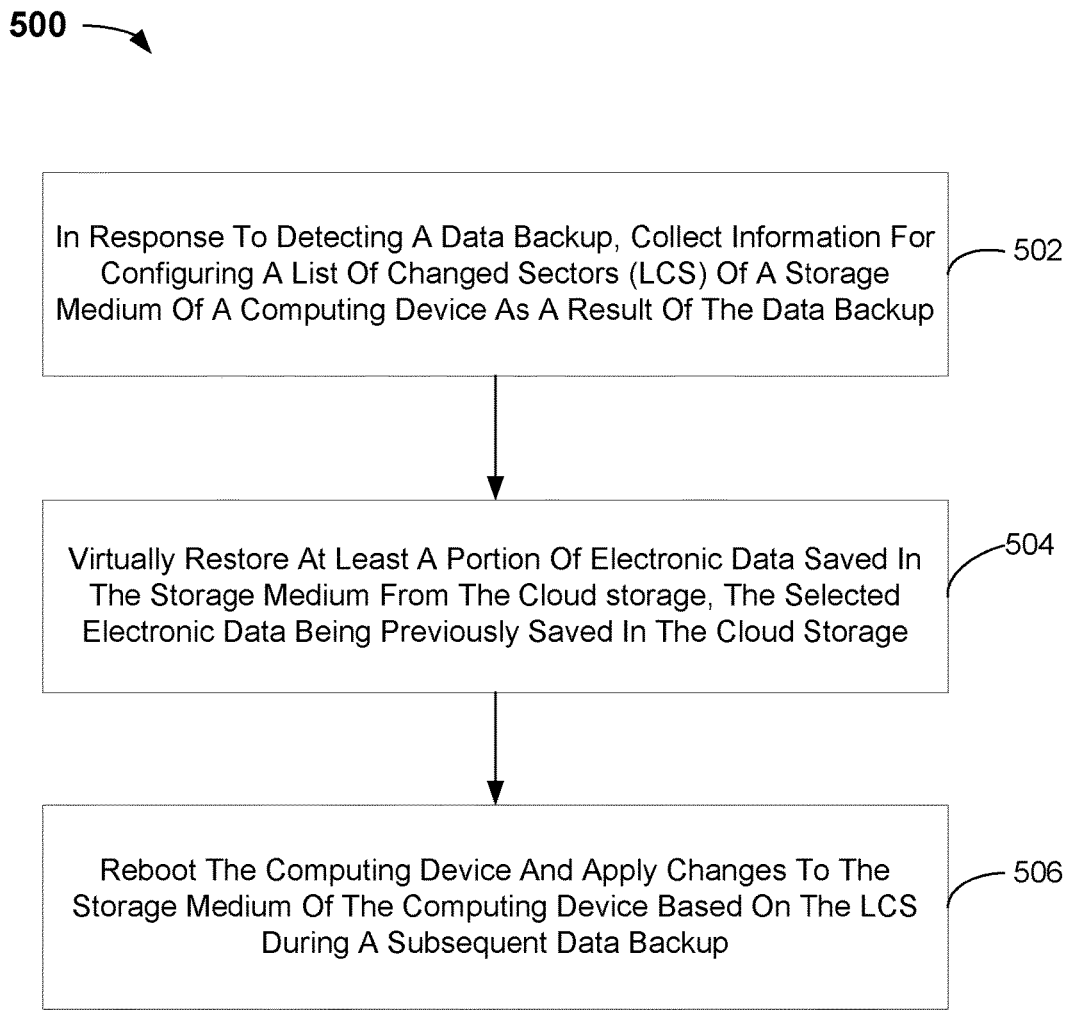
FIG. 5 illustrates a method for live virtual incremental restoring of data from a cloud storage according to an exemplary aspect.

FIG. 5 illustrates a method 500 for live virtual incremental restoring of data from a cloud storage, according to exemplary aspects of the present invention. Initially at Step 502, the method comprises, in response to detecting a data backup, collecting information by a hardware processor of the physical machine 102 for configuring the LCS 122 of the memory 106 as a result of the data backup. Next, at Step 504, the method comprises virtually restoring at least a portion of electronic data saved in the memory 106 of the physical machine 102 from the cloud storage 110, the selected electronic data being previously saved in the cloud storage 110. At Step 506, the method 500 comprises rebooting the physical machine 102 and applying changes to the memory 106 based on the LCS 122 during a subsequent data backup.

The method 500 further comprises creating the VVS 124 by the dedicated boot loader 120 of the physical machine 102 in response to the data backup. More specifically, in connection with the discussions above with respect to FIG. 2, the dedicated boot loader 120 may be configured to: reboot the physical machine 102 by deactivating the standard boot loader of the physical machine 102 (e.g., a Windows loader); establish a connection to the cloud storage 110; set hooks to intercept input/output (I/O) requests into itself and the default boot loader on the VVS 124; and activate the default boot loader of the physical machine 102.

Moreover, in connection with the discussions above with respect to FIG. 3, the method 500 also comprises configuring the VVS 124 to: detect one or more write requests to the memory 106 occurred during two consecutive data backups; store the one or more write requests in a dedicated storage associated with the VVS 124; in response to determining that a requested sector corresponding to at least one read request is located in the dedicated storage, obtain information relating to data changes from the dedicated storage; in response to determining that the requested sector is located in the LCS 122, obtain information relating to data changes from the cloud storage 110; and in response to determining that the requested sector is not located in the LCS 122, obtain information relating to data changes from an original volume of the requested sector.

The method 500 further comprises running an OS of the physical machine 102 based on information stored on the VVS 124 for checking applications and data associated with the physical machine 102. In response to a command not to restore data, the physical machine 102 is rebooted using its standard OS (e.g., a Windows OS). On the other hand, in response to a command to restore data, the method 500 comprises: checking one or more restored sectors that are detected based on an indicia such as an identifier, a flag or one or more bits; redirecting the one or more write requests to the memory 106 and marking corresponding sectors of the memory 106 as restored; and copying sectors from the dedicated storage of the VVS 124 and the cloud storage 110 and marking these sectors as restored. In response to detecting all sectors being marked as restored, the method 500 comprises disabling the dedicated boot loader 120 and unloading the hooks. Finally, the method comprises, in response to detecting that an activated working mode of the computing device disables the dedicated storage, directing all data requests to the storage medium of the computing device to the dedicated storage before rebooting the computing device, and disabling the dedicated storage by the dedicated boot loader.

Additionally, the present invention may be used in a bare-metal restoration of electronic data with the aid of a data cloud. Bare-metal restore here generally refers to a technique in the field of data recovery and restoration where the backed up data is available in a form which allows one to restore a computer system from "bare metal," i.e., without any requirements as to previously installed software or OS.

As previously noted, a 500 GB system partition, which is stored in a cloud storage, may require at least several hours to perform a complete data restoration according to existing techniques. In practice, one working with Windows system may need about 500 MB of system data including main Windows services and components to boot Windows which may be performed in several minutes. According to the exemplary aspect, the VVS 124 may be configured to boot this virtualized partition. As such, all the data needed for a user are restored according the user's requests, and all sectors are restored from the backup archive 112 according to the particular needs of the user. In other words, it may be determined, a priori, that some of the sectors have higher priority than others, in the restoration process. For example, certain applications' data or some databases, which are frequently used, may be restored first, rather than restoring one by one as they were stored in the backup archive 112. Any changes occurred after the partition boot are written into the VVS 124 and can be applied on a final step of restoration or they can be discarded. Additionally, all the changes occurred during a system restoration may be written into the backup archive 112 as a separate slice.

FIG. 6 illustrates an example computer system (which may be a personal computer or a server) on which the disclosed systems and method can be implemented according to an example aspect. It should be appreciated that the detailed computer system can correspond to the physical machine 102 and the memory 106 as described above with respect to FIG. 1. Moreover, the processor 21 of computer 20 can be configured to execute each of the backup software 104 including the backup application 114, the volume tracker module 116, the virtual restoring engine 118, and the dedicated boot loader 120.

As shown in FIG. 6, the computer system 20 includes the processor or central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for live virtual incremental restoring of data from a cloud storage, the method comprising:
    in response to detecting a data backup, collecting information by a hardware processor of a computing device for configuring a list of changed sectors (LCS) of a storage medium of the computing device as a result of the data backup;
    virtually restoring at least a portion of electronic data saved in the storage medium of the computing device from the cloud storage, the selected electronic data being previously saved in the cloud storage; and
    rebooting the computing device and applying changes to the storage medium of the computing device based on the LCS during a subsequent data backup.

2. The method of claim 1, further comprising creating a virtual volume set (VVS) by a dedicated boot loader of the computing device in response to the data backup, the VVS being configured to:
    detect one or more write requests to the storage medium of the computing device occurred during two consecutive data backups;
    store the one or more write requests in a dedicated storage associated with the VVS;
    in response to determining that a requested sector corresponding to at least one read request is located in the dedicated storage, obtain information relating to data changes from the dedicated storage;
    in response to determining that the requested sector is located in the LCS, obtain information relating to data changes from the cloud storage; and
    in response to determining that the requested sector is not located in the LCS, obtain information relating to data changes from an original volume of the requested sector.

3. The method of claim 2, wherein the dedicated boot loader of the computing device is further configured to:
    reboot the computing device by deactivating a default boot loader of the computing device;
    establish a connection to the cloud storage;
    set hooks to intercept input/output (I/O) requests into the dedicated boot loader and the default boot loader on the VVS; and
    activate the default boot loader.

4. The method of claim 3, further comprising:
    running an operating system (OS) of the computing device based on information stored on the VVS for checking applications and data associated with the computing device; and
    in response to a command not to restore data, rebooting the computing device using the OS of the computing device.

5. The method of claim 3, further comprising:
    running an operating system (OS) of the computing device based on information stored on the VVS for checking applications and data associated with the computing device; and
    in response to a command to restore data, checking one or more restored sectors that are detected based on an indicia;
    redirecting the one or more write requests to the storage medium of the computing device and marking corresponding sectors of the storage medium as restored; and
    copying sectors from the dedicated storage and the cloud storage and marking the sectors as restored.

6. The method of claim 5, further comprising: in response to detecting all sectors being marked as restored, disabling the dedicated boot loader and unloading the hooks.

7. The method of claim 6, further comprising restoring a plurality of sectors of the computing device based on a priority determined based at least upon a usage frequency of each sector.

8. The method of claim 2, further comprising:
    in response to detecting that an activated working mode of the computing device disables the dedicated storage, directing all data requests to the storage medium of the computing device to the dedicated storage before rebooting the computing device, and disabling the dedicated storage by the dedicated boot loader.

9. A system for live virtual incremental restoring of data from a cloud storage, the system comprising:
    an electronic memory; and
    a hardware processor couple to the electronic memory and configured to:
        in response to detecting a data backup, collect information for configuring a list of changed sectors (LCS) of the electronic memory of the computing device as a result of the data backup;
        virtually restore at least a portion of electronic data saved in the electronic memory of the computing device from the cloud storage, the selected electronic data being previously saved in the cloud storage; and
        reboot the computing device and apply changes to the electronic memory of the computing device based on the LCS during a subsequent data backup.

10. The system of claim 9, wherein the processor is further configured to create a virtual volume set (VVS) by a dedicated boot loader of the computing device in response to the data backup to:
    detect one or more write requests to the electronic memory of the computing device occurred during two consecutive data backups;
    store the one or more write requests in a dedicated storage associated with the VVS;
    in response to determining that a requested sector corresponding to at least one read request is located in the dedicated storage, obtain information relating to data changes from the dedicated storage;

in response to determining that the requested sector is located in the LCS, obtain information relating to data changes from the cloud storage; and in response to determining that the requested sector is not located in the LCS, obtain information relating to data changes from an original volume of the requested sector.

11. The system of claim 10, wherein the dedicated boot loader of the computing device is further configured to:

reboot the computing device by deactivating a default boot loader of the computing device;

establish a connection to the cloud storage;

set hooks to intercept input/output (I/O) requests into the dedicated boot loader and the default boot loader on the VVS; and activate the default boot loader.

12. The system of claim 11, wherein the processor is further configured to:

run an operating system (OS) of the computing device based on information stored on the VVS for checking applications and data associated with the computing device; and in response to a command not to restore data, reboot the computing device using the OS of the computing device.

13. The system of claim 12, wherein the processor is further configured to:

run an operating system (OS) of the computing device based on information stored on the VVS for checking applications and data associated with the computing device; and in response to a command to restore data, check one or more restored sectors that are detected based on an indicia;

redirect the one or more write requests to the electronic memory of the computing device and mark corresponding sectors of the storage medium as restored; and copy sectors from the dedicated storage and the cloud storage and mark the sectors as restored.

14. The system of claim 13, wherein the processor is further configured to disable the dedicated loader and unload the hooks in response to detecting all sectors being marked as restored.

15. The system of claim 14, wherein the processor is further configured to restore a plurality of sectors of the computing device based on a priority determined based at least upon a usage frequency of each sector.

16. A non-transitory computer readable medium storing computer executable instructions for live virtual incremental restoring of data from a cloud storage, the instructions being configured for:

in response to detecting a data backup, collecting information by a hardware processor of a computing device for configuring a list of changed sectors (LCS) of a storage medium of the computing device as a result of the data backup;

virtually restoring at least a portion of electronic data saved in the storage medium of the computing device from the cloud storage, the selected electronic data being previously saved in the cloud storage; and rebooting the computing device and applying changes to the storage medium of the computing device based on the LCS during a subsequent data backup.

17. The non-transitory computer readable medium of claim 16, further comprising instructions for creating a virtual volume set (VVS) by a dedicated boot loader of the computing device in response to the data backup to:

detect one or more write requests to the storage medium of the computing device occurred during two consecutive data backups;

store the one or more write requests in a dedicated storage associated with the VVS;

in response to determining that a requested sector corresponding to at least one read request is located in the dedicated storage, obtain information relating to data changes from the dedicated storage;

in response to determining that the requested sector is located in the LCS, obtain information relating to data changes from the cloud storage; and in response to determining that the requested sector is not located in the LCS, obtain information relating to data changes from an original volume of the requested sector.

18. The non-transitory computer readable medium of claim 17, wherein the dedicated boot loader of the computing device is further configured to:

reboot the computing device by deactivating a default boot loader of the computing device;

establish a connection to the cloud storage;

set hooks to intercept input/output (I/O) requests into the dedicated boot loader and the default boot loader on the VVS; and activate the default boot loader.

19. The non-transitory computer readable medium of claim 18, further comprising instructions for:

running an operating system (OS) of the computing device based on information stored on the VVS for checking applications and data associated with the computing device; and in response to a command not to restore data, rebooting the computing device using the OS of the computing device;

in response to a command to restore data:

checking one or more restored sectors that are detected based on an indicia;

redirecting the one or more write requests to the storage medium of the computing device and marking corresponding sectors of the storage medium as restored; and copying sectors from the dedicated storage and the cloud storage and marking the sectors as restored.

20. The non-transitory computer readable medium of claim 19, further comprising instructions for:

in response to detecting all sectors being marked as restored, disabling the dedicated boot loader and unloading the hooks; and restoring a plurality of sectors of the computing device based on a priority determined based at least upon a usage frequency of each sector.

* * * * *